(12) United States Patent
Tapie et al.

(10) Patent No.: US 7,024,610 B2
(45) Date of Patent: Apr. 4, 2006

(54) DATA TRANSMISSION METHOD

(75) Inventors: Thierry Tapie, Rennes (FR); Ingrid Autier, Rennes (FR); Jean-Charles Guillemot, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 391 days.

(21) Appl. No.: 10/407,547

(22) Filed: Apr. 4, 2003

(65) Prior Publication Data

US 2004/0017774 A1    Jan. 29, 2004

(30) Foreign Application Priority Data

Apr. 9, 2002   (FR) ................................. 02 04523

(51) Int. Cl.
*G08C 25/02* (2006.01)
(52) U.S. Cl. .................................... 714/748
(58) Field of Classification Search ........ 714/746–749, 714/712, 43, 48, 49, 50, 55, 56; 370/241, 370/242, 248, 394, 395, 901, 905
See application file for complete search history.

(56) References Cited

U.S. PATENT DOCUMENTS

| 3,876,979 | A | | 4/1975 | Winn et al. ............... 340/146.1 |
| 4,110,558 | A | | 8/1978 | Kageyama et al. ......... 178/69.1 |
| 4,584,684 | A | * | 4/1986 | Nagasawa et al. ........... 714/749 |
| 6,496,520 | B1 | * | 12/2002 | Acosta ........................ 370/474 |
| 6,587,985 | B1 | * | 7/2003 | Fukushima et al. ......... 714/748 |
| 6,606,321 | B1 | * | 8/2003 | Natanson et al. ......... 370/395.2 |

FOREIGN PATENT DOCUMENTS

WO    WO01/52466    7/2001

OTHER PUBLICATIONS

Chen C-X et al: "Performance Analysis of Go-Back-N ARQ Scheme on Parallel Channel System", Electronics & Communications in Japan, vol. 81, No. 2 pp. 10-19.

* cited by examiner

*Primary Examiner*—Christine T. Tu
(74) *Attorney, Agent, or Firm*—Joseph S. Tripoli; Robert D. Shedd; Paul P. Kiel

(57) ABSTRACT

A process for transmitting data in a network adapted for isochronous and asynchronous transmissions and comprising a sender and at least one receiver. The process comprises the steps of:
 opening an isochronous transmission channel between the sender and the receiver;
 dispatching by the sender through the isochronous channel of a plurality of start of transmission indicator packets until reception of an acknowledgement of receipt on the part of the receiver,
 following the reception of the acknowledgement of receipt by the sender, dispatching by the sender through the isochronous channel of at least one payload packet;
 following the detection of the poor reception of a packet, dispatching by the receiver of an error message to the sender;
 in case of reception by the sender of an error message dispatched by the receiver, resumption of the transmission of payload data onwards of the error;
 dispatching by the sender through the isochronous channel of an end of message packet following the transmission of all the payload data.

The invention also provides a process for receiving data comprising the steps of error detection hereinabove, from the point of view of a receiver, as well as a sending process comprising the steps of dispatching the start of transmission indicator packets and awaiting acknowledgement of receipt indicator packets, from the point of view of a sender.

15 Claims, 4 Drawing Sheets

DATA TRANSMISSION METHOD

This application claims the benefit under 35 U.S.C. 119(a) of French patent application No. 0204523 filed Apr. 9, 2002.

BACKGROUND OF THE INVENTION

The invention relates to a method of transmitting data through an isochronous channel, and applies in particular but nonlimitingly to networks based on the IEEE 1394 standard.

In contradistinction to isochronous transfer, the transfer of files (namely any information not presented in the form of a "stream") over a network based on one or more IEEE 1394 type serial buses is done asynchronously. Specifically, the asynchronous route makes it possible to cater for an acknowledgement of receipt mechanism, which does not exist in isochronous mode. This mechanism makes it possible to request a new transmission of corrupted packets, guaranteeing the reliability of the transmitted data.

In the least favourable case, the asynchronous route uses only 20% of the global bandwidth, the remainder being reserved for the isochronous route. This leads to an overly long transmission time when transferring voluminous files.

It would therefore be desirable to be able to transfer files isochronously, with the aim of being able to profit from the wider bandwidth reserved for this mode. The absence of guarantee of proper reception of the transmitted packets does not however allow the use of the isochronous mode for the reliable transmission of data. Packets may therefore be irredeemably lost, making all the data transmitted unusable, for example in the case of the transmission of the code of an application. For isochronous streams of audio or video type, the loss of one or more packets is of hardly any importance: on the one hand mechanisms for masking such errors generally exist, and on the other hand, the streams comprise, at relatively short intervals, entry points requiring no knowledge of the past stream. For files or other data which have to be transmitted in full and without error, this loss of packets is obviously not acceptable.

In addition to the corrupting of packets in the steady state, it may happen that several hundred kilo-bytes are missing at the start of an isochronous stream. At file level, this would result in the deletion of the header, this being equally unacceptable.

SUMMARY OF THE INVENTION

The subject of the invention is a process for transmitting data in a network adapted for isochronous and asynchronous transmission and comprising a sender and at least one receiver characterized by the steps of:
  opening an isochronous transmission channel between the sender and the receiver;
  dispatching by the sender through the isochronous channel of a plurality of start of transmission indicator packets until reception of an acknowledgement of receipt on the part of the receiver;
  following the reception of the acknowledgement of receipt by the sender, dispatching by the sender through the isochronous channel of at least one payload packet;
  following the detection of the poor reception of a packet, dispatching by the receiver of an error message to the sender;
  in case of reception by the sender of an error message dispatched by the receiver, resumption of the transmission of payload data onwards of the error;
  dispatching by the sender through the isochronous channel of an end of message packet following the transmission of all the payload data.

The dispatching of start of transmission packets by the sender while awaiting the reception of an acknowledgement of receipt on the part of the receiver makes it possible to avoid the loss of the first few payload packets.

Detection of poor reception or of a lack of reception of a packet and return to the sender makes it possible to request the retransmission of the packet or packets concerned.

These two aspects are claimed independently in the other two independent claims.

According to a particular embodiment, the message of acknowledgement of receipt of the receiver relating to the start of transmission indicator packet is dispatched asynchronously.

According to a particular embodiment, the error message is dispatched asynchronously.

According to a particular embodiment, each packet comprises a cue identifying the type of packet from among at least the following types: start of transmission indicator packet, payload packet, end of message packet.

According to a particular embodiment, each packet transmitted comprises a continuity counter value allowing the receiver to detect the incorrect reception of a packet.

According to a particular embodiment, the process moreover comprises the step, at the receiver level, of identifying the first payload packet by the two following conditions:
  packet of payload packet type, and
  continuity with the previous packet, which is of start of transmission packet type.

According to a particular embodiment, the start of transmission packets comprise an indication of the total size of the payload data to be transmitted.

The subject of the invention is also a process for sending data in a network adapted for isochronous and asynchronous transmission and comprising a sender and at least one receiver characterized by the steps, at the sender level, of:
  following the opening of an isochronous channel, dispatching by the sender through the isochronous channel of a plurality of start of transmission indicator packets until reception of an acknowledgement of receipt on the part of the receiver;
  dispatching by the sender through the isochronous channel of at least one payload packet, following the reception of the acknowledgement of receipt.

According to a particular embodiment, the process furthermore comprises the steps of:
  in case of reception by the sender of an error message dispatched by the receiver following poor reception of a packet, resumption of the transmission of the payload data onwards of the error;
  dispatching by the sender through the isochronous channel of an end of message packet following the transmission of all the payload data.

The subject of the invention is also a process for receiving data in a network adapted for isochronous and asynchronous transmission and comprising a sender and at least one receiver characterized, at the receiver level, by the steps of:
  receiving payload packets through the isochronous channel and verifying the correct transmission of the packets;
  in case of detection of poor transmission of a packet, dispatching of an error message to the sender, the said error message indicating the position of the error with respect to the payload data;

following the transmission of the error message, awaiting of reception of payload packets onwards of the said position.

According to a particular embodiment, the process furthermore comprises the following step:

following the opening of an isochronous transmission channel between the sender and the receiver, awaiting reception of a start of transmission indicator packet through the isochronous channel and as the case may be dispatching of an acknowledgement of receipt to the sender.

DESCRIPTION OF THE DRAWINGS

Other characteristics and advantages of the invention will become apparent through the description of a nonrestrictive exemplary embodiment. This exemplary embodiment will be described with the aid of the enclosed figures. Among these figures.

DETAILED DESCRIPTION OF AN EMBODIMENT OF THE INVENTION

The exemplary embodiment comes within the framework of a transmission on an IEEE 1394 type bus, but the invention is not limited to this particular environment and may be applied within other frameworks where isochronous and asynchronous transmission share a bandwidth. Information pertaining to IEEE 1394 buses may be found in particular in the documents (a) P1394-1995 Standard for a High Performance Serial Bus and (b) P1394a-2000 Standard for a High Performance Serial Bus (amendment). Furthermore, it may be payload to refer to the documents (c) IEC 61883-x (in particular for x equal to 1 and 4) as regards the transmission of isochronous streams over IEEE 1394 bus.

According to the exemplary embodiment, sequences are defined pertaining to startup, loss control and end of transfer in isochronous mode, so as to guarantee the validity of the data transmitted at receiver level. The sequences are transmitted by packets of particular format, which is defined hereinbelow. Certain control messages are transmitted in asynchronous mode.

Figure 1:
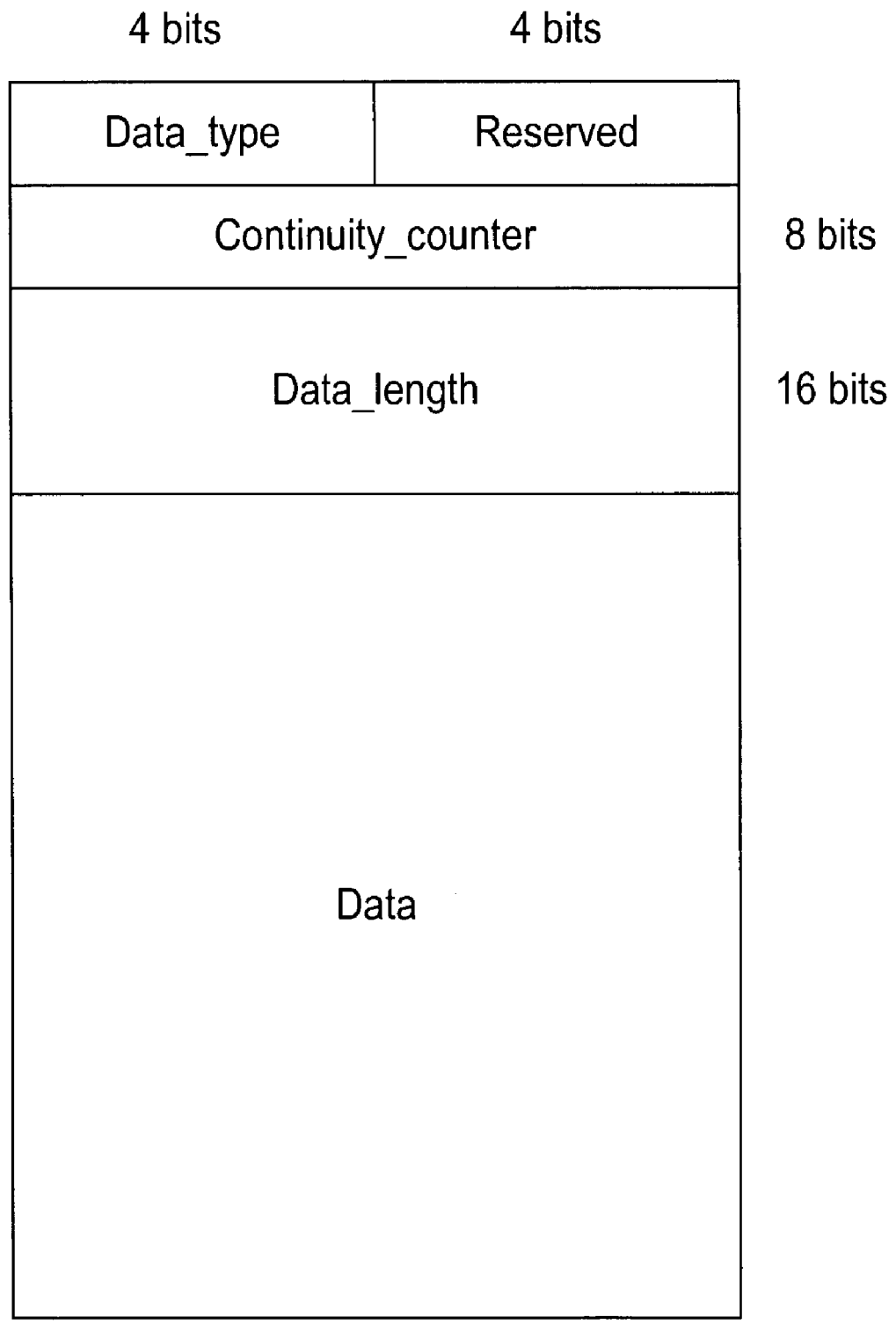
FIG. 1 diagrammatically represents a data packet used according to the present example for the transmission of the data via an isochronous channel.

FIG. 1 illustrates the format of the packets used according to the present example to transmit the data in isochronous mode. This format comprises five fields: 'Data_type', 'Reserved', 'Continuity_counter', 'Data_length' and 'Data'.

The 'Data_type' field makes it possible to identify the content of the packet. The values of this field are those indicated in Table 1 below:

TABLE 1

| Value | Type of packet |
|---|---|
| START_SEQ | start sequence |
| DATA_SEQ | payload sequence |
| END_SEQ | end sequence |

The 'Continuity_counter' field comprises 8 bits and is incremented modulo 256 with each packet transmitted. The detection of a lack of continuity at the receiver level will make it possible to detect the loss of a packet.

The 'Data_length' field specifies the length of the payload field.

The 'Data' field comprises the payload data (the segmented file).

The steps implemented for the transmission of data other than a stream (file) are as follows:

Firstly, an isochronous channel is reserved at the bus isochronous resource manager (or IRM), in a manner known per se in accordance with document (a) cited at the start of the description. The reserved bandwidth depends on the capacities of the sender and of the receiver, as well as on the requirements of the application in question. The output connection control register of a sender ('Output Plug Control Register' or 'oPCR') and the input connection control register of a receiver ('Input Plug Control Register' or 'iPCR') are written by the connection controller, also in a manner known per se, in accordance with document (c), part 1.

Secondly, the sender informs the receiver that payload data have to be transmitted.

Figure 2:
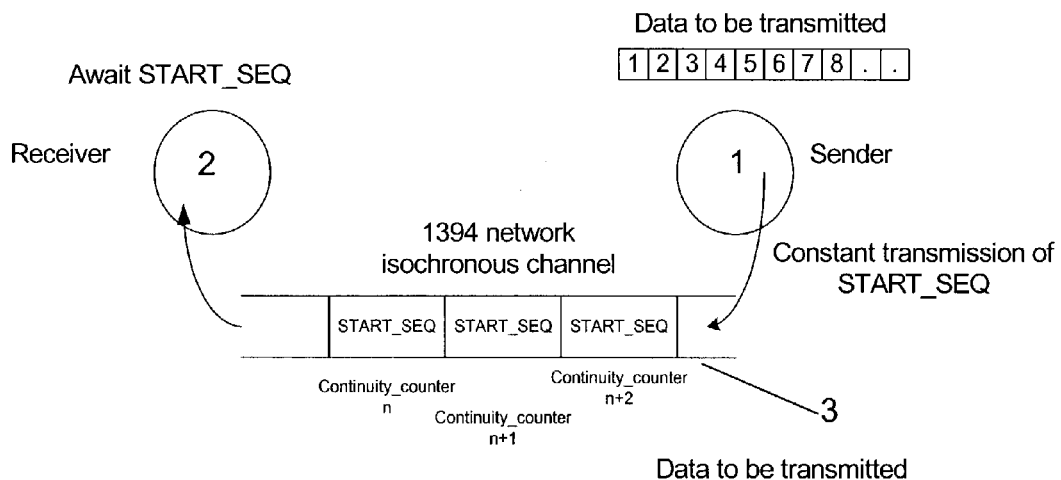
FIG. 2 represents a schematic of a first step of data exchanges between a sender and a receiver, with a view to initializing a transmission by isochronous channel in accordance with the present exemplary embodiment.

FIG. 2 illustrates the start of this phase. Represented diagrammatically therein are a sender 1 and a receiver 2, as well as the isochronous transmission channel 3.

The sender 1 constantly dispatches packets comprising the 'Data_type' field equal to the value START_SEQ. The value of the continuity counter is incremented for each packet.

According to an alternative embodiment of the present example, the 'Data' field of a packet of START_SEQ type comprises a data item indicating the length of the file to be transferred.

The receiver 2 listens to the isochronous channel on which data is supposedly to be received. It probes the channel so as to detect the arrival of a packet possessing the START_SEQ type and therefore forming part of the sequence of startup packets.

Figure 3:
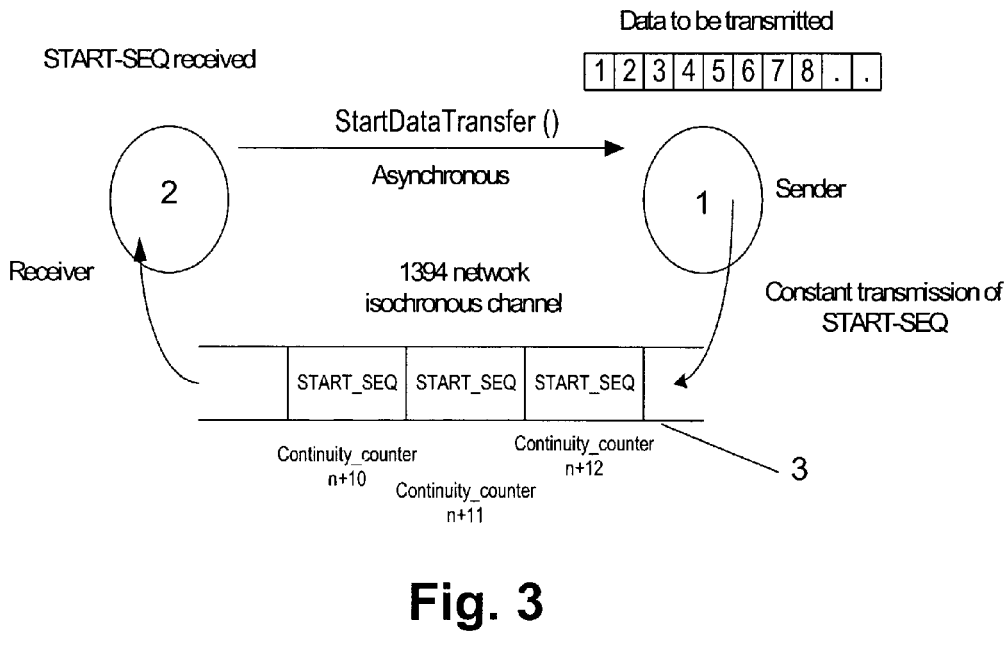
FIG. 3 represents a second step of the initialization phase.

FIG. 3 illustrates the behaviour of the receiver once a packet of START_SEQ type has been detected. The receiver dispatches an asynchronous message ('StartDataTransfer( )') to acknowledge receipt of the packet containing the startup sequence and to request the sending of the data of the file beginning from the start of the file (zero offset). During this time, the sender continues to send startup packets.

Figure 4:
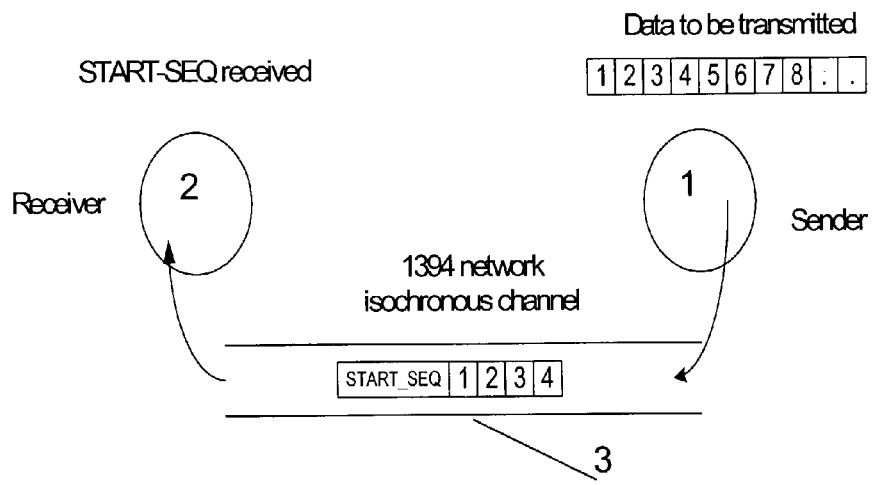
FIG. 4 represents a schematic illustrating the transmission of payload data following a receiver acknowledgement of receipt transmitted to the sender.
Figure 5:
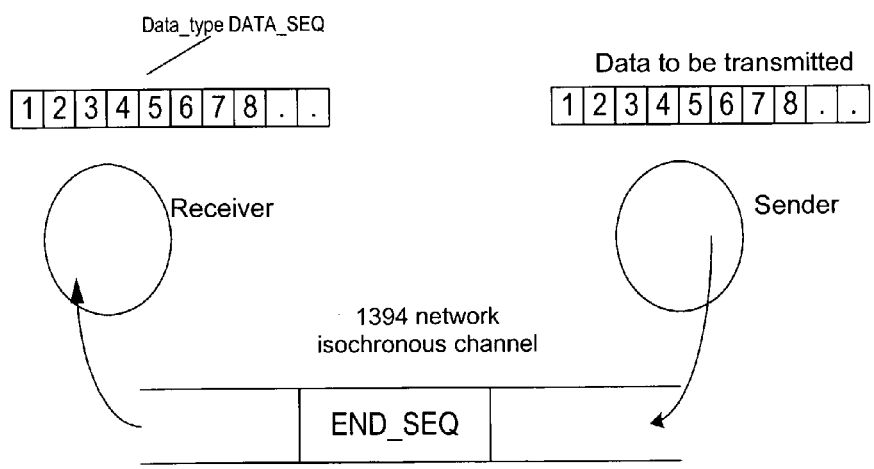
FIG. 5 represents a schematic illustrating the transmission of an end of transfer packet by the sender.

Thirdly, following the acknowledgement of receipt sent by the receiver, the sender commences the sending of packets comprising by way of payload the data of the file to be transferred, beginning from the offset defined by the receiver (see FIG. 4). The type of these packets is DATA_SEQ.

The receiver detects the first packet containing the payload data by verifying on the one hand that the value of the continuity counter is correct with respect to the startup packet immediately preceding it, and that the type of this packet is indeed DATA_SEQ. The receiver then knows that the packet is valid and comprises the start of the file. The processing of the discontinuities in the packets and which will be explained later applies also in the case of the DATA_SEQ packets.

Fourthly, the transmission of the packets of 'payload data' type is continued.

The sender continues to transmit the data while incrementing the value of the continuity counter and still assigning the value DATA_SEQ to the 'Data_type' field.

On its side, the receiver continues to receive the data, verifies that the continuity counter shows no discontinuity and that the type of packet is still equal to DATA_SEQ.

The sender continues to transmit packets comprising payload data until the end of the file is reached. The sender then dispatches an end of sequence packet, assigning the value END_SEQ to the 'Data_type' field.

The receiver receives this packet. It knows that the transmission is completed and can halt the acquisition of the data.

Figure 6:
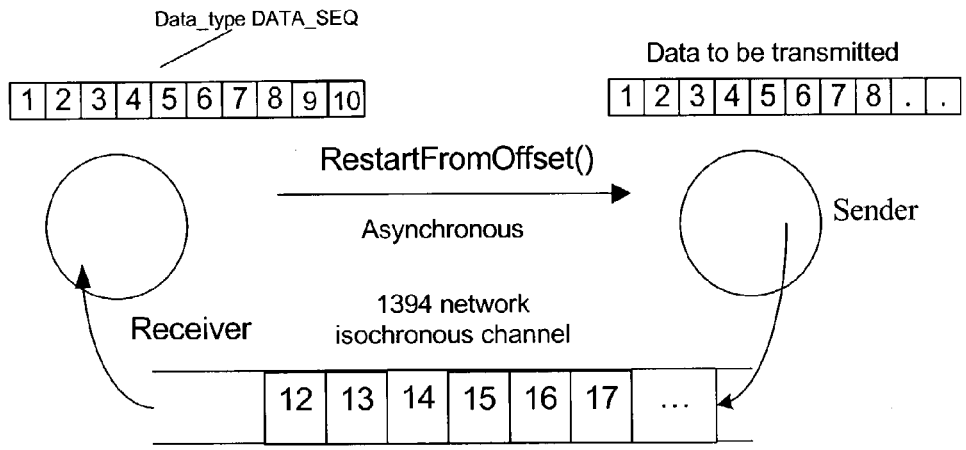
FIG. 6 represents a schematic illustrating the dispatching of a discontinuity message by the receiver following the detection of a discontinuity in the packets received.
Figure 7:
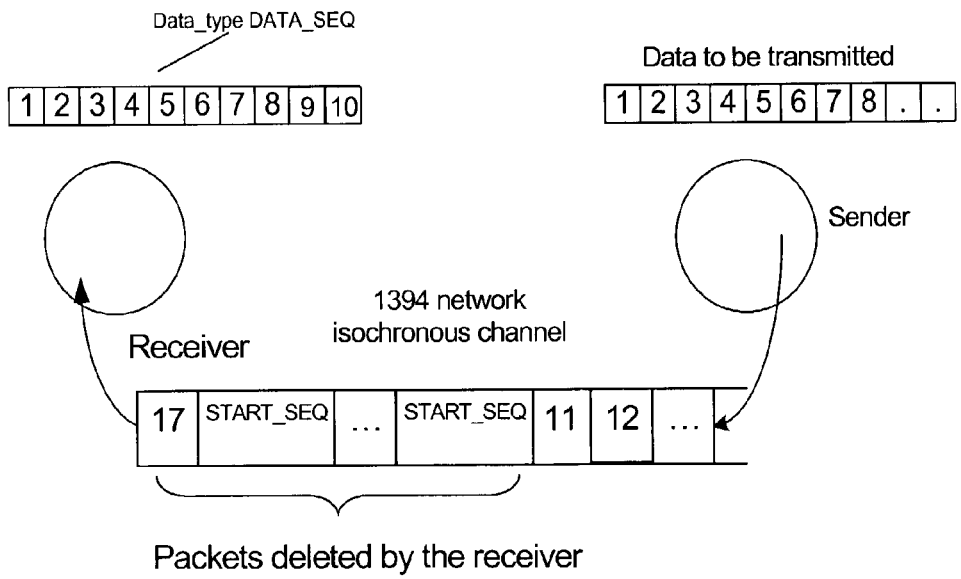
FIG. 7 represents the subsequent behaviour of the receiver and of the sender in the case of FIG. 6.

The processing of the discontinuities is as follows:

If the receiver notes a loss of packet following a discontinuity of value of continuity counter in two consecutive packets, it transmits a message to the sender asking it to resend the data onwards of the discontinuity, by specifying for example the offset onwards of the start of the file onwards of which the sender is supposedly to resume the transmission. FIG. 6 shows a discontinuity consisting of the non-receipt of packet number 11, for example following an irrecoverable corruption of this packet. To simplify the explanations, the packet numbers are taken equal to the values of the continuity counter for each of the packets. The offset is determined from the length of the payload fields of the packets previously received. For example, if the last packet received correctly is the packet having a continuity value x, and if the next packet possesses the value x+2, then the receiver requests the resending onwards of the packet x+1. The payload packets received by the receiver after packet x but before the resending phase are set aside. These are the packets sent by the sender before it reacts to the receiver's discontinuity message, by a resumption of the transmission onwards of the offset (FIG. 7). Retransmission is preceded by a START_SEQ sequence, as previously.

If the receiver does not receive a packet (in particular END_SEQ) for a predetermined time, it also asks again for the transmission onwards of the last data item correctly received. There is then restarting of the entire transmission mechanism (i.e. START_SEQ packets, DATA SEQ packets if there are still payload data to be transmitted, then END_SEQ packet.

Although according to the exemplary embodiment presented, the detection of poor transmission of a packet (or the absence of such a packet) is effected by way of a check of continuity counter value, other possibilities of detection are not excluded from the invention (error correcting codes for example). The mechanism of return of information to the sender within the framework of an essentially isochronous transmission may therefore be applied in a wider manner.

The invention claimed is:

1. Process for transmitting data in a network adapted for isochronous and asynchronous transmission and comprising a sender and at least one receiver comprising the steps of:
opening an isochronous transmission channel between the sender and the receiver;
dispatching by the sender through the isochronous channel of a plurality of start of transmission indicator packets until reception of an acknowledgement of receipt on the part of the receiver,
following the reception of the acknowledgement of receipt by the sender, dispatching by the sender through the isochronous channel of payload data comprised within at least one payload packet;
following the detection of the poor reception of a packet, dispatching by the receiver of an error message to the sender;
in case of reception by the sender of an error message dispatched by the receiver, resumption of the transmission of payload data onwards of the error;
dispatching by the sender through the isochronous channel of an end of message packet following the transmission of all the payload data.

2. Process according to claim 1, wherein the message of acknowledgement of receipt of the receiver relating to the start of transmission indicator packet is dispatched asynchronously.

3. Process according to claim 1, wherein the error message is dispatched asynchronously.

4. Process according to claim 1, wherein each packet comprises data identifying the type of packet from among at least the following types: start of transmission indicator packet, payload packet, end of message packet.

5. Process according to claim 1, wherein each packet transmitted comprises a continuity counter value allowing the receiver to detect the incorrect reception of a packet.

6. Process according to claim 5, comprising the further step, at the receiver level, of identifying the first payload packet by the two following conditions:
packet of payload packet type, and
continuity with the previous packet, which is of start of transmission packet type.

7. Process according to claim 1, wherein the start of transmission packets comprise an indication of the total size of the payload data to be transmitted.

8. Process for sending data in a network adapted for isochronous and asynchronous transmission and comprising a sender and at least one receiver comprising the steps, at the sender level, of:
following the opening of an isochronous channel, dispatching by the sender through the isochronous channel of a plurality of start of transmission indicator packets until reception of an acknowledgement of receipt on the part of the receiver;
dispatching by the sender through the isochronous channel of payload data comprised within at least one payload packet, following the reception of the acknowledgement of receipt.

9. Process according to claim 8, furthermore comprising the steps of:
in case of reception by the sender of an error message dispatched by the receiver following poor reception of a packet, resumption of the transmission of the payload data onwards of the error;
dispatching by the sender through the isochronous channel of an end of message packet following the transmission of all the payload data.

10. Process according to claim 8, wherein each packet comprises a data item identifying the type of packet from among at least the following types: start of transmission indicator packet, payload packet, end of message packet.

11. Process according to claim 8, wherein the packets transmitted comprise a continuity counter value allowing the receiver the detection of the incorrect reception of a packet.

12. Process according to claim 8, wherein the start of transmission packets comprises an indication of the total size of the payload data to be transmitted.

13. Process for receiving data in a network adapted for isochronous and asynchronous transmission and comprising a sender and at least one receiver comprising, at the receiver level, the steps of:
- receiving payload data comprised within payload packets through the isochronous channel and verifying the correct transmission of the packets;
- in case of detection of poor transmission of a packet, dispatching of an error message to the sender, the said error message indicating the position of the error with respect to the payload data;
- following the transmission of the error message, awaiting of reception of payload packets onwards of the said position.

14. Process according to claim 13, wherein the detection of poor transmission of a packet is carried out by analysing a continuity value contained in the packet.

15. Process according to claim 13, further comprising the step:
- following the opening of an isochronous transmission channel between the sender and the receiver, awaiting reception of a start of transmission indicator packet through the isochronous channel and as the case may be dispatching of an acknowledgement of receipt to the sender.

* * * * *